(12) United States Patent
Shibata et al.

(10) Patent No.: US 11,318,762 B2
(45) Date of Patent: May 3, 2022

(54) INCREASING DRYING OF PRINT JOB PAGE TO BE COMPILED HAVING PRINT FLUID AT LOCATION CORRESPONDING TO COMPILING PADDLES

(71) Applicant: HEWLETT-PACKARD DEVELOPMENT COMPANY, L.P., Spring, TX (US)

(72) Inventors: Alan Shibata, Vancouver, WA (US); Stephen Thomas Rohman, Vancouver, WA (US); Lorraine T. Golob, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/499,904

(22) PCT Filed: Jun. 7, 2018

(86) PCT No.: PCT/US2018/036422
§ 371 (c)(1),
(2) Date: Oct. 1, 2019

(87) PCT Pub. No.: WO2019/236086
PCT Pub. Date: Dec. 12, 2019

(65) Prior Publication Data
US 2021/0323321 A1 Oct. 21, 2021

(51) Int. Cl.
*B41J 11/00* (2006.01)
*G06K 15/10* (2006.01)
*G06K 15/02* (2006.01)

(52) U.S. Cl.
CPC ........ *B41J 11/00212* (2021.01); *B41J 11/002* (2013.01); *G06K 15/102* (2013.01); *G06K 15/1823* (2013.01)

(58) Field of Classification Search
CPC .............. B41J 11/0021; B41J 11/00212; B41J 11/00214; B41J 11/00216; B41J 11/00218; B41J 11/0022; B41J 11/00222; B41J 11/00224; B41J 11/0024; B41J 11/00242; B41J 11/00244; B41J 11/002; G06K 15/102; G06K 15/1823; B65H 31/08; B65H 31/10; B65H 31/30; B65H 31/3009; B65H 31/3132; B65H 31/3136
See application file for complete search history.

(56) References Cited

U.S. PATENT DOCUMENTS

| 5,098,074 A | 3/1992 | Mandel et al. |
| 5,396,321 A | 3/1995 | McFarland et al. |
| 10,560,584 B2 * | 2/2020 | Beachnau Hood .......... H04N 1/00721 |

FOREIGN PATENT DOCUMENTS

WO  WO2017099804 A1  6/2017

\* cited by examiner

*Primary Examiner* — An H Do
(74) *Attorney, Agent, or Firm* — Michael Dryja

(57) ABSTRACT

A page of a print job is to be compiled by a printing device upon printing. It is determined that at time of compiling, the page will include print fluid, greater than a threshold, at locations corresponding to the compiling paddles. Drying of the page is responsively increased upon the device printing the page.

15 Claims, 8 Drawing Sheets

INCREASING DRYING OF PRINT JOB PAGE TO BE COMPILED HAVING PRINT FLUID AT LOCATION CORRESPONDING TO COMPILING PADDLES

BACKGROUND

Printing devices are devices that can form images on media, like print media such as paper. Examples of printing devices include inkjet-printing devices, which eject, or jet, print fluid like ink onto media to form images on media, where the terminology "image" is inclusive of text. Printing devices include standalone printers, as well as all-in-one (AIO) or multifunction devices (MFDs) that have functionality in addition to printing functionality, such as scanning, copying, and/or faxing functionality.

DETAILED DESCRIPTION

Figure 1A:
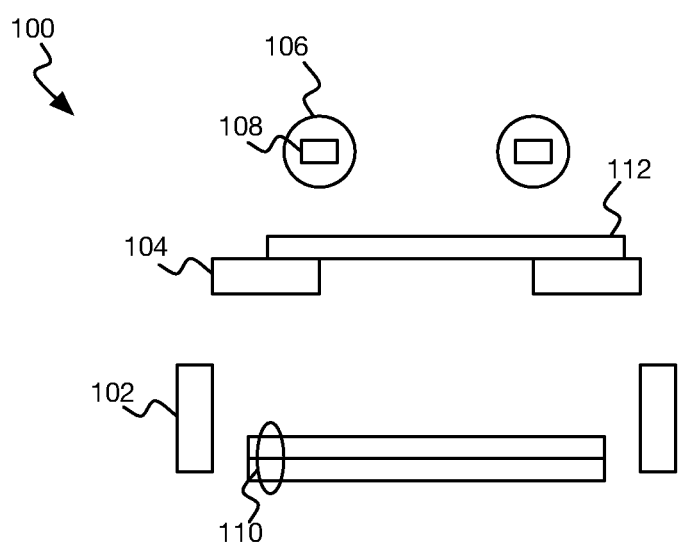
FIGS. 1A, 1B, 1C, and 1D are front-view diagrams of example compiling within an inkjet-printing device.

As noted in the background, printing devices form images on media. After printing on pages of such media in correspondence with a print job, some types of printing devices are capable of performing finishing operations. Examples of finishing operations that can be performed on a completed print job include stapling, three-hole punching, and offsetting the print job in relation to other print jobs.

For proper performance of a finishing operation, the pages of a print job are first arranged in a neat printed page stack, in which corresponding edges of the pages are aligned to one another. The process of assembling the printed page stack in such a manner, when an additional page of a job print job has been printed, is known as compiling. That is, the pages are compiled into a neat stack, so that their top edges are flush with one another, their bottom edges are flush with one another, their left edges are flush with one another, and their right edges are flush with one another.

Compiling can occur separately over the two axes of the completed print job pages. For instance, when another page of a print job has been printed and deposited onto a printed page stack, compiling brackets to the sides of the page edges orthogonal to one axis may move inward to straighten the stack along this axis, such as from left to right. Compiling paddles may then rotate downwards to move the most recently printed page against an alignment bracket orthogonal to the other axis and against which the previously printed pages of the stack have already been aligned, to straighten the stack along this other axis, such as from top to bottom.

Inkjet-printing devices that can perform finishing operations on print jobs can have difficulty compiling the pages of the print jobs as they are printed, however. The compiling paddles may sometimes fail to completely move certain pages of a print job against the alignment bracket, resulting in an unstraightened, out-of-specification, or loose printed page job stack. Increasing the force at which the paddles advance the pages against the bracket to overcome this issue, however, may cause other pages to be flung at sufficiently highly velocity against the alignment bracket that they bounce back, also resulting in an unstraightened, out-of-specification, or loose stack. Pages may also over-compile causing them to buckle and thus resulting in poor stack quality or paper jams.

The inventors have novelly determined that a reason why the compiling paddles completely advance some print job pages against the alignment bracket whereas fail to completely advance other pages against the bracket has to do with the amount and location of ink printed on the pages. Some types of inkjet-printing devices can deposit printed pages facedown against already printed pages. If a print job page has sufficient ink at locations corresponding to where the compiling paddles will contact the page on the its other, upward-facing side, the paddles are more likely to fail to completely move the page against the alignment bracket.

Deposited ink on a page can increase the friction of the page relative to the page against which its printed side is facing, as compared to the bare, unprinted medium of the page itself. Ink can be dye-based, in which colorant is fully dissolved in a carrier liquid, or can be pigment ink, in which solid particles are suspended in the carrier fluid. In both cases, ejecting ink onto a medium can resultantly increase the liquid content of the medium, increasing page-to-page friction as noted above. The end result is that the compiling paddles may be unable to completely move the page against the alignment bracket, or page buckling if increased force is employed by the paddles in advancing the page against the bracket.

Described herein are techniques that overcome these difficulties. Whether a page of a print job to be compiled by an inkjet-printing device includes ink at locations corresponding to the compile paddles of the device, greater than a threshold, is determined. If the print job page does include ink at these locations greater than the threshold, then drying of the page is increased prior to compiling being performed. For example, the page may be printed more slowly, which increases drying time and thus drying of the printed page.

Increasing drying of the printed page can stiffen the page by decreasing the liquid content of the ink deposited on the page. Friction of this page relative to the page against which its printed side is facing is thus reduced. Therefore, when compiling occurs, the compiling paddles have a greater likelihood of completely moving the page against the alignment bracket, without having to increase the force at which the paddles move the page. Pages that do not have ink at locations corresponding to the compiling paddles can still be printed at a non-reduced speed.

FIGS. 1A, 1B, 1C, and 1D are front views of example compiling within an inkjet-printing device 100, whereas FIGS. 2A, 2B, 2C, and 2D are corresponding side views of the example compiling. FIGS. 1A-1D show that the inkjet-printing device 100 can include compiling brackets 102, release brackets 104, and compiling mechanisms 106 having respective compiling paddles 108. FIGS. 2A-2D show that the device 100 can also include an alignment bracket 202. The compiling mechanisms 106 with their respective compiling paddles 108 are depicted in FIGS. 2A-2D, but the compiling brackets 102 and the release brackets 104 are omitted from FIGS. 2A-2D for illustrative clarity.

Figure 2A:
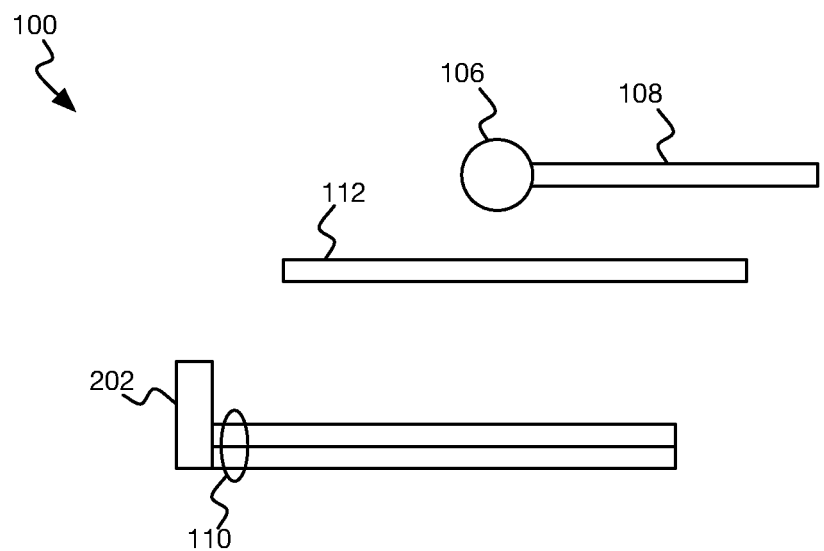
FIGS. 2A, 2B, 2C, and 2D are side-view diagrams of the example compiling of FIGS. 1A, 1B, 1C, and 1D.

In FIGS. 1A and 2A, a stack 110 of printed pages has already been compiled, such that the corresponding edges of the pages are aligned within one another within the stack 110. Printing of a page 112 has been completed, and the page 112 dropped onto the release brackets 104. The page 112 may have been printed face-side down, such that the side of the page 112 on which ink was most recently ejected faces the printed page stack 110.

Figure 1B:
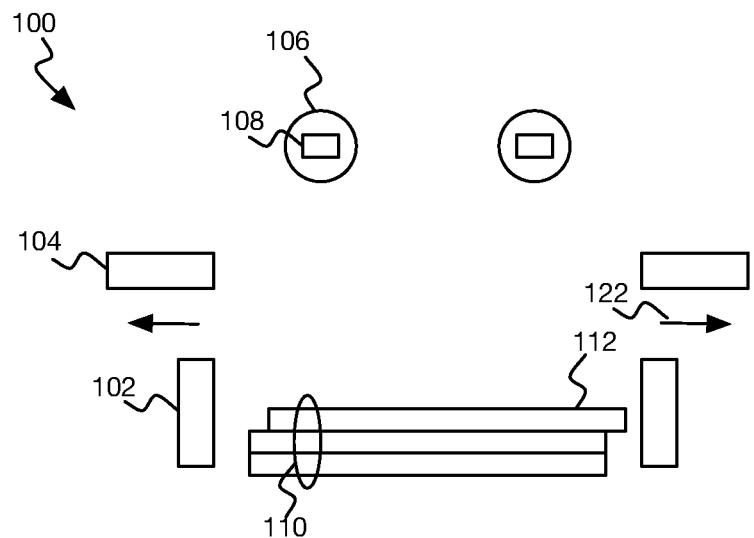
Figure 2B:
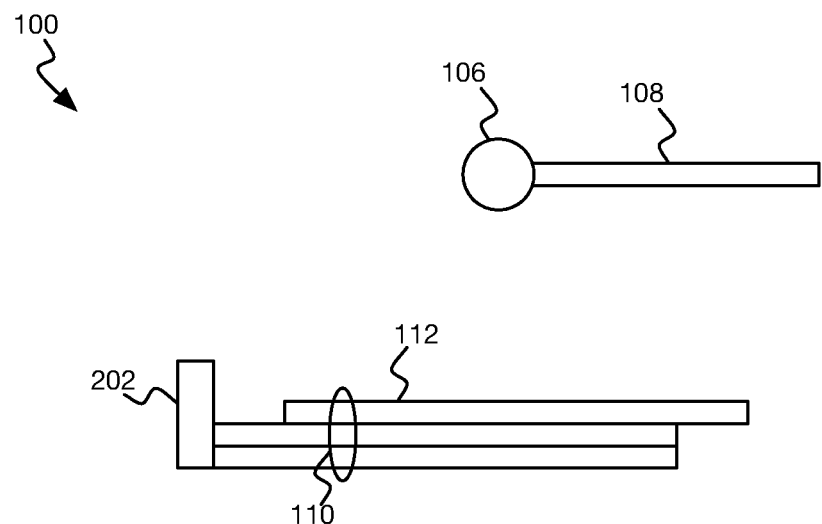

In FIGS. 1B and 2B, the release brackets 104 have moved outwards, as indicated by arrows 122 in FIG. 1B. As such, the page 112 is released onto the printed page stack 110, and becomes part of the stack 110. As depicted in FIG. 1B, the edges of the page 112 visible in FIG. 1B are not aligned with the corresponding edges of the other pages of the stack 110. Likewise, as depicted in FIG. 2B, the edges of the page 112 visible in FIG. 2B are not aligned with the corresponding edges of the other pages of the stack 110.

Figure 1C:
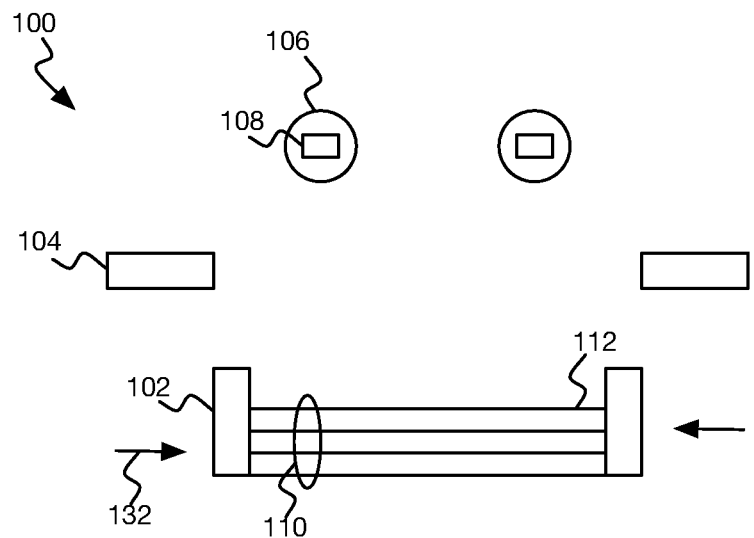
Figure 2C:
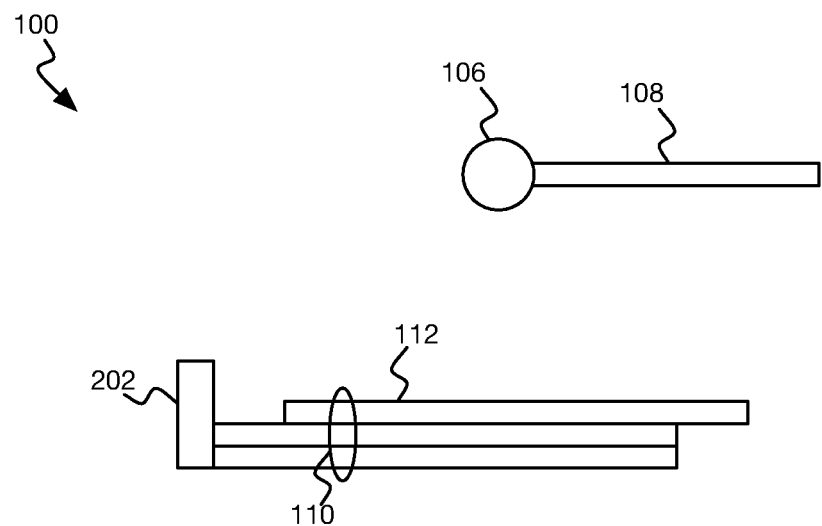

In FIGS. 1C and 2C, the compiling brackets 102 have move inwards, as indicated by arrows 132 in FIG. 1C. As such, as depicted in FIG. 1C, the edges of the page 112 visible in FIG. 1C become aligned with the corresponding edges of the other pages of the printed page stack 110. However, as depicted in FIG. 2C, the edges of the page 112 visible in FIG. 2C remain unaligned with the corresponding edges of the other pages of the stack 110, as in FIG. 2B.

Figure 1D:
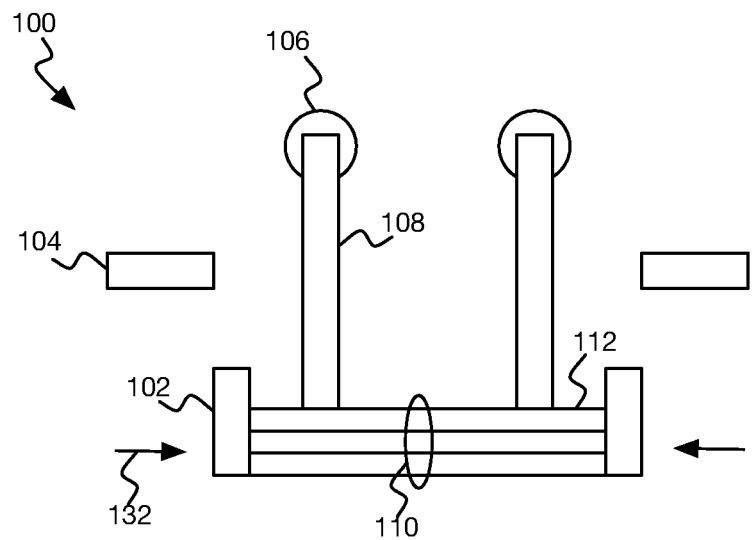
Figure 2D:
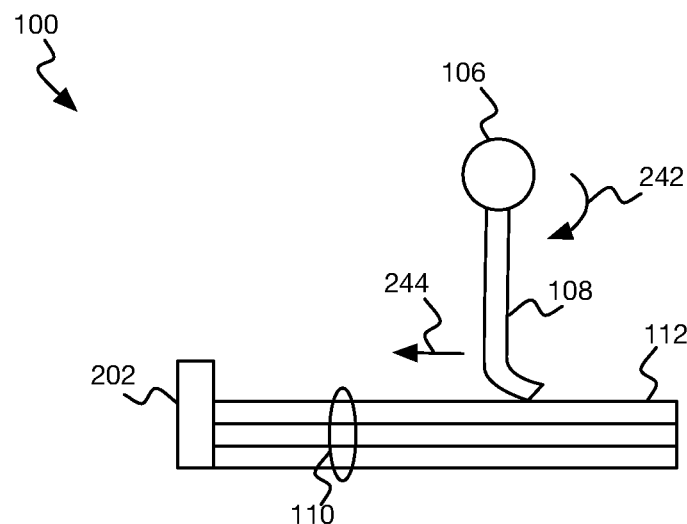

In FIGS. 1D and 2D, the compiling mechanisms 106 have rotated clockwise, as indicated by arrow 242 in FIG. 2D. The compiling paddles 108 have engaged the page 112 and moved the page 112 against the alignment bracket 202, as indicated by arrow 244 in FIG. 2D. Therefore, all four edges of the page 112 are now aligned with the corresponding edges of the printed page stack 110. As depicted in FIG. 2D, the edges of the page 112 visible in FIG. 2D become aligned with the corresponding edges of the other pages of the stack 110. The edges of the page 112 visible in FIG. 1D remain aligned with the corresponding edges of the other pages of the stack 110, as in FIG. 1C.

Figure 3:
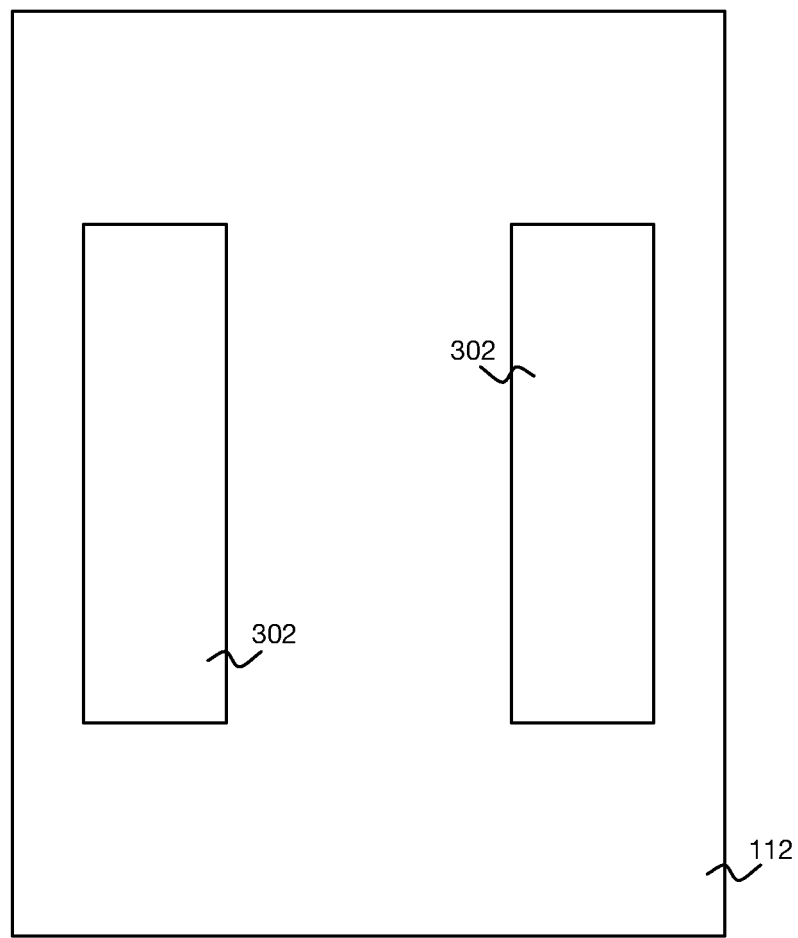
FIG. 3 is a diagram of example locations of a page corresponding to compiling paddles of an inkjet-printing device.

FIG. 3 shows example locations 302 of the page 112 that correspond to where the compiling paddles 108 are located. The short side of the page 112 in FIG. 3 corresponds to the edge of the page 112 depicted in FIGS. 1A-1D, and the long side corresponds to the edge depicted in FIGS. 2A-2D. The width of the locations 302 corresponds to the width of the paddles 108 in FIGS. 1A-1D, such as by being identical to the width of the paddles 108.

The length of the locations 302 corresponds to the length of the compiling paddles 108 in FIGS. 2A-2D. In one implementation, the length of the locations 302 corresponds to the length of the paddles 108 by being identical to the length of the paddles 108. In another implementation, the length of the locations 302 can be shorter than or longer than the length of the paddles 108 in corresponding to the length of the paddles 108. In such an implementation, the length of the locations 302 may encompass the portions of the page 112 that the paddles 108 can potentially contact when the compiling mechanisms 106 have rotated clockwise and engaged the page 112 in FIG. 2D. The portions of the page 112 that the paddles 108 actually contact in this implementation depends on where the page 112 lands on the printed page stack 110 relative to the paddles 108 when released from the release brackets 104 in FIG. 2B.

As noted above, the inkjet-printing device 100 can print on the page 112 by ejecting ink on the side of the page that faces the printed page stack 110 in FIGS. 1A and 2A. When a sufficient amount of ink is ejected onto the page 112 at the locations 302, there is a greater likelihood that the resulting friction between the page 112 and the page of the stack 110 below the page 112 will be high enough that the compiling paddles 108 are unable to move the page 112 against the alignment bracket 202 in FIGS. 1D and 2D. Therefore, compiling of the printed page stack 110 with the page 112 on top will fail.

Figure 4:
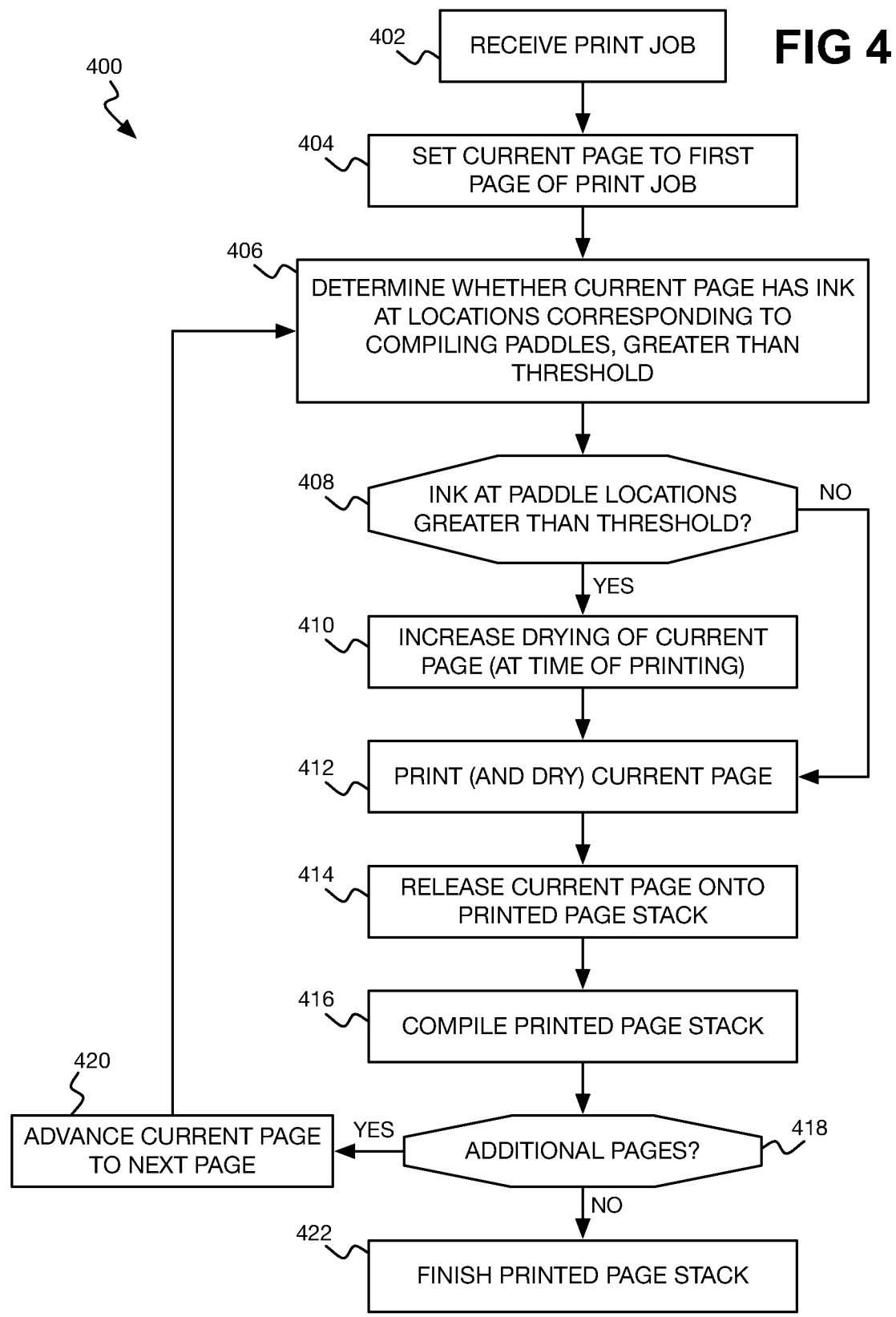
FIG. 4 is a flowchart of an example method for printing and finishing a print job, including increasing drying of pages of the print job that have ink at locations corresponding to compiling paddles.

FIG. 4 shows an example method 400 for printing and finishing a print job, which includes increasing drying of those pages of the print job that have ink at locations corresponding to the compiling paddles 108. The method 400 can be performed by the inkjet-printing device 100. For example, the method 400 may be implemented as instructions stored on a non-transitory computer-readable data storage medium, and executed by the printing device 100.

The printing device 100 receives a print job (402), and sets a current page to the first page of the print job (404). The printing device 100 determines whether the current page has ink at the locations 302 corresponding to the compiling paddles 108, greater than a threshold (406). That is, the printing device 100 determines whether at the time of compiling, the current page will include ink at these locations, greater than the threshold. The ink is one type of print fluid, and the method 400 is applicable to other types of print fluid as well. The printing device 100 makes the determination of part 406 prior to compiling the current page of the print job.

A particular technique for implementing part 406, as well as parts 408 and 410, of the method 400 is described later in the detailed description in relation to FIG. 5. However, in general, the printing device 100 determines whether printing the current page will result in ejection of ink at the locations 302 corresponding to the compiling paddles 108 greater than the threshold, which can correspond to the amount of ink being output at these locations 302 that may result in the paddles 108 unsuccessfully advancing the page against the alignment bracket 202.

For instance, to print the current page, ink may just have to be printed in a small percentage of the locations 302 corresponding to the compiling paddles 108. Therefore, friction between this page when printed and the adjacent page on the compiled printed page stack 110 may be insufficient to prevent the compiling paddles 108 from successfully advancing the page against the alignment bracket 202. However, at some amount of ink within the locations 302 corresponding to the compiling paddles 108, friction can sufficiently increase to prevent the paddles 108 from successfully advancing the page against the alignment bracket 202. The threshold of part 406 can thus be set in correspondence with this amount of ink.

If the amount of ink at the compiling paddle locations 302 is greater than the threshold (408), then the printing device 100 will increase drying of the current page (410), such as when the page is printed. The printing device 100 then prints the current page (412), which can include drying of the current page. This drying is increased drying if the amount of ink at the compiling paddle locations 302 is greater than the threshold, and may not be increased drying if the amount of ink at the paddle locations 302 is not greater than the threshold.

As noted above, a particular technique for implementing part 410, as well as parts 406 and 408, of the method 400 is described later in the detailed description in relation to FIG. 5. However, in general, increasing the drying time of the current page when the page is printed can be implemented in a variety of different ways. For example, the speed at which printing of the current page occurs may be reduced.

Reducing the print speed of the current page increases the length of time before the page is compiled as part of the printed page stack 110. Therefore, the page has more time to dry.

As another example, drying mechanisms within the printing device 100 may be adjusted so that they increase drying of the current page. For instance, a heater may operate at an elevated temperature to increase drying of the current page. A fan may operate at a higher fan speed to increase drying of the current page.

Once the current page has been printed (and dried), the printing device 100 releases the page onto the printed page stack 110 (414). If the current page is the first page of the print job, then releasing the page effectively starts the page stack 110. The printing device 100 compiles the printed page stack 110 (416), including using the compiling paddles 108 to move the current page that has been released on the printed page stack 110 against the alignment bracket 202, as has been described above in relation to FIGS. 1A-1D and 2A-2D.

If there are additional pages in the print job that have not yet been printed (418), then the current page is advanced to the next page within the print job (420), and the method 400 is repeated at part 406. Once all the pages of the print job have been printed, the printing device 100 can finish the printed page stack 110 (i.e., perform a finishing operation) that constitutes the printed print job (422). For example, the printing device 100 may staple the printed page stack 110, or three-hole punch the page stack 110. The printing device may output the printed page stack 110 so that the printed print job is offset in position within an output tray of the printing device in relation to a previously printed print job.

Figure 5:
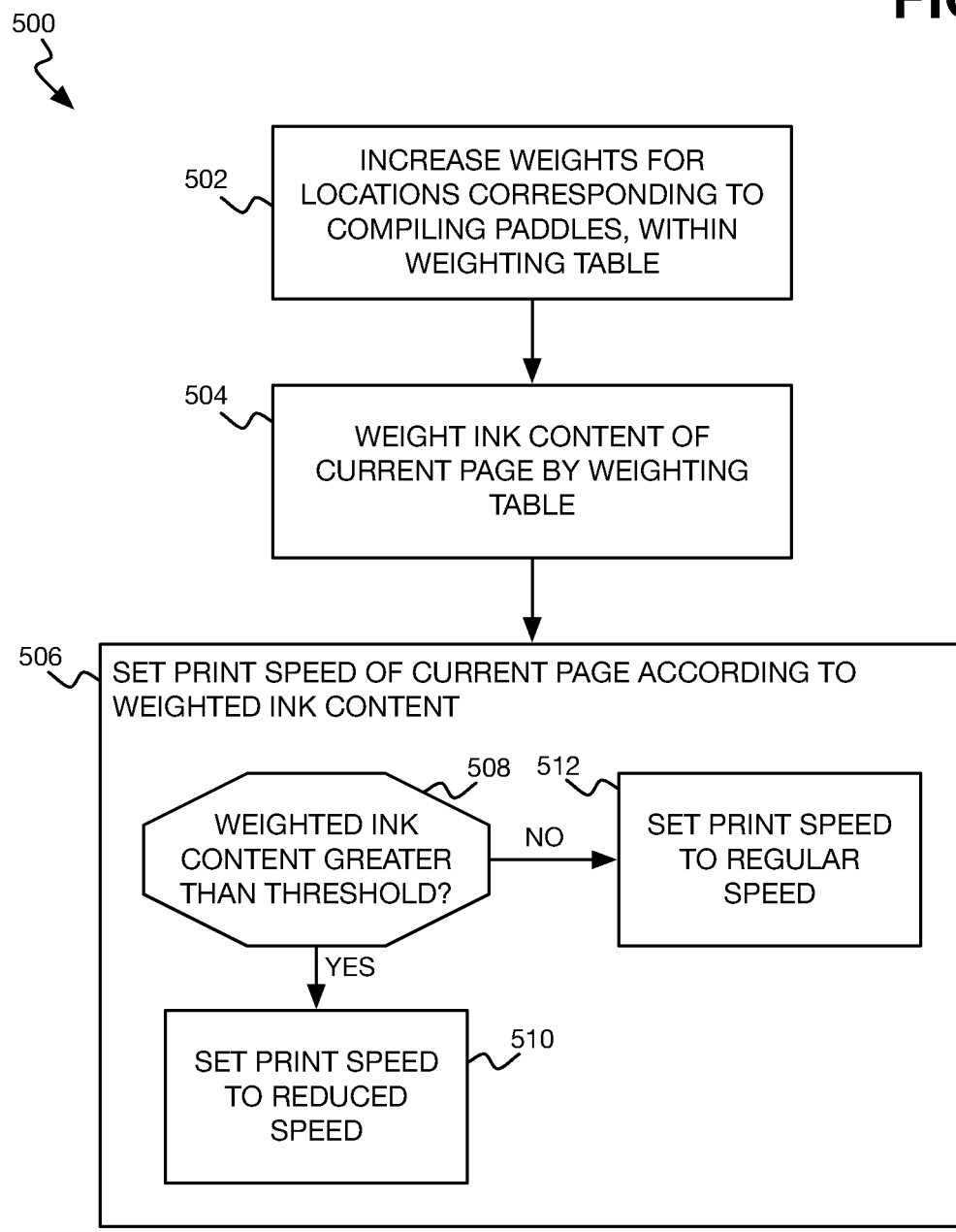
FIG. 5 is a flowchart of an example method for increasing drying of a page that has ink at locations corresponding to compiling paddles.

FIG. 5 shows an example method 500 for increasing drying of a page that has ink at locations corresponding to the compiling paddles 108. The method 500, like the method 400, can be performed by an inkjet-printing device 100, and may be implemented as instructions stored on a non-transitory computer-readable data storage medium and executed by the printing device. The method 500 can implement parts 406, 408, and 410 of the method 400.

The method 500 uses a weighting table corresponding to the locations of a page. An example of a weighting table that can be used is described in the previously filed PCT patent application, "density classifiers based on plane regions," filed on Dec. 11, 2015, and assigned international application no. PCT/US2015/065326. The weighting table is used to determine a weighted ink content of a page. The weighting table can have fewer table entries than the number of locations of the page on which the inkjet-printing device 100 can individually print ink drops, such that each table entry can correspond to a group of locations on the page. The ratio of columns to rows (or vice versa) within the weighting table can be independent of and thus differ from the aspect ratio of the page.

The weights for the locations corresponding to the compiling paddles 108 are increased within the weighting table (502). For example, by default each table entry may have a value of zero. In the PCT patent application referenced above, the table entries corresponding to leading and lagging page edges are increased to above-zero values to identify pages that have sufficient ink at these edges to potentially cause page curling. By comparison, in part 502, the table entries corresponding to the locations of the compiling paddles 108 are increased to identify pages that have sufficient ink at these locations to potentially affect compiling.

The printing device 100 can thus weight the ink content of a current page to be printed by the entries of the weighting table (504). For each table entry, the locations within the group that corresponds to that entry may be summed (or averaged) and then multiplied by the table entry to yield the weighted ink content for this group of locations of the page. The weighted ink content for all the location groups can then be summed to determine a weighted ink content for the page as a whole.

The printing device 100 sets the print speed of the current page to be printed according to the weighted ink content (506). For instance, in one implementation, if the weighted ink content of the current page is greater than a threshold (508), then the print speed is set to a reduced speed to increase drying of the page while printing (510). The weighted ink content of the current page being greater then the threshold in this case means that there is sufficient ink at the locations corresponding to the compiling paddles 108 to potentially prevent successfully advancement by the paddles 108 against the alignment bracket 202. The threshold in part 508 can have a value different than that referred to in conjunction with part 406 of the method 400.

If the weighted ink content of the current page is not greater than the threshold, the printing device 100 sets the print speed to a (non-reduced) regular speed (512). Therefore, just those pages that have sufficiently large amounts of ink at locations corresponding to the compiling paddles 108 may have their print speed reduced. Other pages that do not have as much ink at the locations corresponding to the paddles 108 do not have their print speed reduced because of the reduction in print speed for the pages that do.

Figure 6:
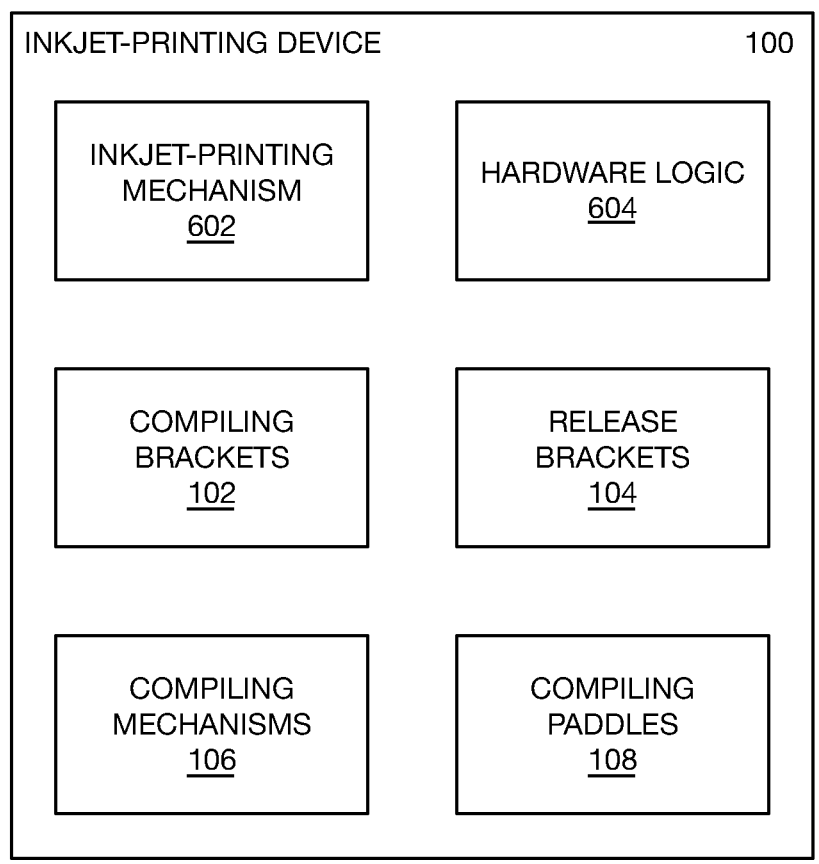
FIG. 6 is a block diagram of an example inkjet-printing device.

FIG. 6 shows a block diagram of the example inkjet-printing device 100. The printing device 100 includes an inkjet-printing mechanism 602 and hardware logic 604. The printing device 100 also includes the compiling brackets 102, the release brackets 104, the compiling mechanism 106, and the compiling paddles 108 that have been described. The inkjet-printing mechanism 602 includes those components of the inkjet-printing device 100 that eject ink onto print media. For example, the mechanism 602 can include inkjet printheads that may have integrated or separate ink supplies.

The hardware logic 604 can perform the methods 400 and 500 that have been described. The hardware logic 604 thus increases drying of those pages that have ink at locations corresponding to the compiling paddles 108 greater than the threshold. The hardware logic 604 can be implemented as an application-specific integrated circuit (ASIC) implementing program code integrated therein, or as a more general-purpose process that executes program code.

The techniques that have been described can ensure that compiling of a printed page stack via compiling paddles is successful. These techniques increase drying of the pages that have sufficient ink at locations corresponding to the compiling paddles. Increasing drying of such pages decreases the likelihood that the compiling paddles will be unable to successfully compile the printed page stack when the pages when they have been released upon the stack.

We claim:

1. A method comprising:
   prior to a printing device compiling a page of a print job using compiling paddles of the device, determining that the page at time of compiling will include, at locations corresponding to the compiling paddles, an amount of print fluid greater than a threshold; and
   responsively increasing drying of the page.

2. The method of claim 1, wherein drying of just the page is increased responsive to determining that the amount of the print fluid at the locations of the page corresponding to the compiling paddles is greater than the threshold.

3. The method of claim 1, further comprising:
after applying the print fluid on the page and drying the page, releasing the page onto a printed page stack;
compiling the printed page stack onto which the page has been released, via the compiling paddles of the device; and
performing a finishing operation on the compiled printed page stack.

4. The method of claim 1, wherein determining that the page at the time of compiling will include, at the locations of the page corresponding to the compiling paddles, the amount of the print fluid greater than the threshold comprises:
weighting the amount of the print fluid of the page by a weighting table in which weights for the locations corresponding to the compiling tables have been increased; and
determining that the weighted amount of the print fluid of the page is greater than another threshold.

5. The method of claim 1, wherein responsively increasing drying of the page comprises:
causing application of the print fluid onto the page at a reduced speed.

6. A non-transitory computer-readable data storage medium storing instructions executable by a printing device to:
receive a print job having a plurality of pages;
print the pages of the print job; and
as the pages are printed, increase drying of the pages that have, at locations of the page corresponding to compiling paddles of the device, an amount of print fluid greater than a threshold.

7. The non-transitory computer-readable data storage medium of claim 6, wherein drying of the pages that have, at the locations of the page corresponding to the compiling paddles, the amount of the print fluid less than the threshold is not increased due to any other page having, at the locations of the page corresponding to the compiling paddles, the amount of the print fluid greater than the threshold.

8. The non-transitory computer-readable data storage medium of claim 6, wherein the instructions are executable by the fluid-printing device to:
as each page is printed, release the page of the print job on a printed page stack, after drying the page;
as each page is released, compile the printed page stack upon which the page has been released, via the compiling paddles of the device; and
after releasing a last page of the print job and subsequently compiling the printed page stack, perform a finishing operation on the compiled printed page stack.

9. The non-transitory computer-readable data storage medium of claim 6, wherein the instructions are executable by the fluid-printing device to:
for each page, weight print fluid content of the page by a weighting table having increased weights for the locations corresponding to the compiling paddles; and
for each page, set a print speed of the page based on the weighted print fluid content of the page.

10. The non-transitory computer-readable data storage medium of claim 9, wherein for each page having, at the locations of the page corresponding to the compiling paddles, the amount of the print fluid greater than the threshold, the print speed of the page is set based on the weighted print fluid content of the page to slow subsequent printing of the page, the slowed subsequent printing of the page increasing drying of the page.

11. An inkjet-printing device comprising:
an inkjet-printing engine to print a plurality of pages of a print job;
a plurality of compiling paddles to compile the pages as the pages are printed; and
hardware logic to increase drying of the pages that have, at locations thereof corresponding to the compiling paddles, an amount of ink greater than a threshold, prior to compiling.

12. The inkjet-printing device of claim 11, wherein drying of the pages that do not have, at the locations thereof corresponding to the compiling paddles, the amount of ink greater than the threshold is unaffected by increasing drying of the pages that have, at the locations thereof corresponding to the compiling paddles, the amount of ink greater than the threshold.

13. The inkjet-printing device of claim 11, further comprising:
a release bracket upon which the pages are dropped after printing, the release bracket to subsequently release the pages onto a printed page stack; and
an alignment bracket, against which the compiling paddles are to compile the printed page stack as the pages are released onto the printed page stack.

14. The inkjet-printing device of claim 11, wherein the hardware logic is to print each page at a print speed corresponding to a weighted ink content of the page,
wherein the weighted ink content having the ink at the locations corresponding to the compiling paddles is greater than an ink content threshold corresponding to a reduced print speed,
wherein the reduced print speed having the ink at the locations corresponding to the compiling paddles increases drying.

15. The inkjet-printing device of claim 14, wherein the hardware logic is to determine the weighted ink content of each page by weighting ink content of the page by a weighting table having increased weights for the locations corresponding to the compiling paddles.

* * * * *